United States Patent [19]
Inamori et al.

[11] Patent Number: 5,185,517
[45] Date of Patent: Feb. 9, 1993

[54] SEMICONDUCTOR INTEGRATED CIRCUIT FOR MEASURING DISTANCE FOR AUTOMATIC FOCUSING

[75] Inventors: Masanori Inamori, Tenri; Toshihide Miyake, Nara, both of Japan

[73] Assignee: Sharp Kabushiki Kaisha, Osaka, Japan

[21] Appl. No.: 831,441

[22] Filed: Feb. 5, 1992

[30] Foreign Application Priority Data

Feb. 7, 1991 [JP]  Japan .................................... 3-39231

[51] Int. Cl.$^5$ ............................................... G01J 1/20
[52] U.S. Cl. ................................ 250/201.4; 354/403
[58] Field of Search ................ 250/561, 201.4, 201.6, 250/201.7, 201.8; 356/1, 4, 5, 141, 152; 354/402, 403, 404

[56] References Cited
U.S. PATENT DOCUMENTS 4,620,089 10/1986 Schlichting et al. ............. 250/201.4
4,943,157 7/1990 Reding .............................. 250/561

Primary Examiner—David C. Nelms
Assistant Examiner—K. Shami

[57] ABSTRACT

For use with an automatic focusing device, a semiconductor integrated circuit is provided for measuring distance having a light-detecting element for receiving light from an object, the distance to the subject is to be measured, and outputting a signal according to the distance from the object. The semiconductor integrated circuit is formed in one chip and includes a distance measurement arithmetic unit for forming digital distance measurement data inversely proportional to the distance to the object from the signal from the light-detecting element; a memory unit for writing therein two items of distance measurement data output from the distance measurement arithmetic unit with regard to two known distances in a calibration mode, and a data arithmeteic unit for computing an automatic focusing device control signal from the two items of distances measurement data stored in the memory unit and distance measurement data output from the distance measurement arithmetic unit in a distance measuring mode.

7 Claims, 4 Drawing Sheets

SEMICONDUCTOR INTEGRATED CIRCUIT FOR MEASURING DISTANCE FOR AUTOMATIC FOCUSING

BACKGROUND OF THE INVENTION

1. Field of the Invention

The present invention relates to a distance measuring semiconductor integrated circuit as a main component of a distance measuring unit mounted on an active or passive type automatic focusing device.

2. Description of the Related Art

The distance measuring unit mounted on an automatic focusing device, when the unit is of an active type, normally includes a light-emitting diode for emitting light to a subject, where the distance to the subject is to be measured, a PSD (Position Sensitive Detector) element for receiving the light reflected by the subject and outputting a current according to the angle of incidence of the light, and a distance measuring integrated circuit (distance measuring IC) for converting the current supplied by the PSD element from an analog form to a digital form and then computing data (distance measurement data) corresponding to the distance to the subject.

In such distance measuring units as described above, fine adjustments of the optical system are performed physically in order to correct measuring errors due to dispersion in the fabrication of distance measuring ICs and the displacement of the optical system (a light-detecting element, a light-emitting element, etc.).

However, the measuring errors are very difficult to correct completely by the above-mentioned adjustment of the optical system. Therefore, an electrical method is used to eliminate the measuring errors. More specifically, the distance measuring IC is provided with two to three terminals for external connections with variable resistances dedicated to adjustments and by adjusting the values of those adjusting resistances at the initial stage of use, the current is modified at the position of the A-D converter to thereby eliminate errors of the distance measurement data. This correction method using the adjusting resistances requires the resistance values to be adjusted by repeating the distance measurement a number of times until output data becomes the desired distance measurement data. As a result, a large amount of labor is required.

As a method of eliminating errors of measurement data without using adjusting resistances, a correcting method is known in which an independent memory is attached externally to an ordinary distance measuring IC and this memory is used to store a linear function obtained by measuring known distances with this distance measuring IC. The problems with this method are that not only is an externally-attached memory used but also a circuit for generating timing pulses for adjustment is required. Also, wiring needs must be added to interconnect the elements, and that, above all, a burden of preparing software for the CPU becomes very large.

SUMMARY OF THE INVENTION

Therefore, the present invention has as its object to provide a distance measuring IC which enables cost reduction and performance improvement of the distance measuring unit.

According to the present invention, the above object can be achieved by a semiconductor integrated circuit for measuring distance for use with an automatic focusing device, the semiconductor integrated circuit having a light detecting element which receives light from an object of distance measurement and outputting a signal according to the distance to this object, and the structure for the semiconductor integrated circuit will be described in the following.

This semiconductor integrated circuit has the components formed in one chip.

The components includes a distance measurement arithmetic unit for forming, from signals from the light detecting element, digital distance measurement data inversely proportional to the distance up to the object, a memory unit for storing two items of distance measurement data, supplied from the distance measurement arithmetic unit, with regard to two known distance measurement arithmetic unit, with regard to two known distances in the calibration mode, and a data arithmetic unit for computing an automatic focusing device control signal from two items of distance measurement data stored in the memory unit and distance measurement data supplied from the distance measurement arithmetic unit in the distance measuring mode.

Preferably, there is formed control logic means capable of selectively switching between the above-mentioned calibration mode and the above-mentioned distance measuring mode according to control signals input from outside in this one chip.

The memory unit should preferably be an EEPROM. Preferably, this EEPROM should be CMOS and the semiconductor integrated circuit should be formed as a Bi-CMOS.

The semiconductor integrated circuit may be one for use in an active type automatic focusing device.

Further objects and advantages of the present invention will be apparent from the following description of the preferred embodiments of the invention as illustrated in the accompanying drawings.

DESCRIPTION OF THE PREFERRED EMBODIMENTS

Figure 1:
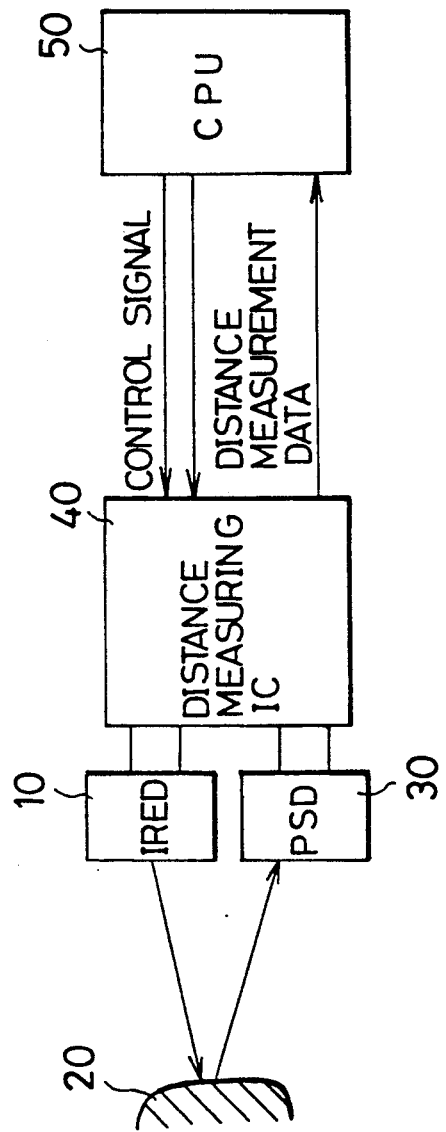
FIG. 1 is a schematic representation of the structure of the distance measuring unit as a preferred embodiment of the present invention.

FIG. 1 schematically shows the structure of an active type distance measuring unit to be mounted on a compact camera or the like as a preferred embodiment of the present invention.

In FIG. 1, reference numeral 10 denotes an infrared-emitting diode for emitting light to the subject 20, the distance to the subject 20 is to be measured, reference numeral 30 denotes a PSD (Position Sensitive Detector) element for receiving a reflected light from the subject 20 and outputting a current according to the incidence angle of the light, reference numeral 40 denotes a distance measuring integrated circuit (distance measuring IC) for converting the current supplied by the PSD element 30 from an analog form to a digital form and computing data (distance measurement data) corresponding to the distance to the subject 20, and reference numeral 50 denotes a CPU (Central Processing Unit) for controlling the whole distance measuring unit.

Figure 2:
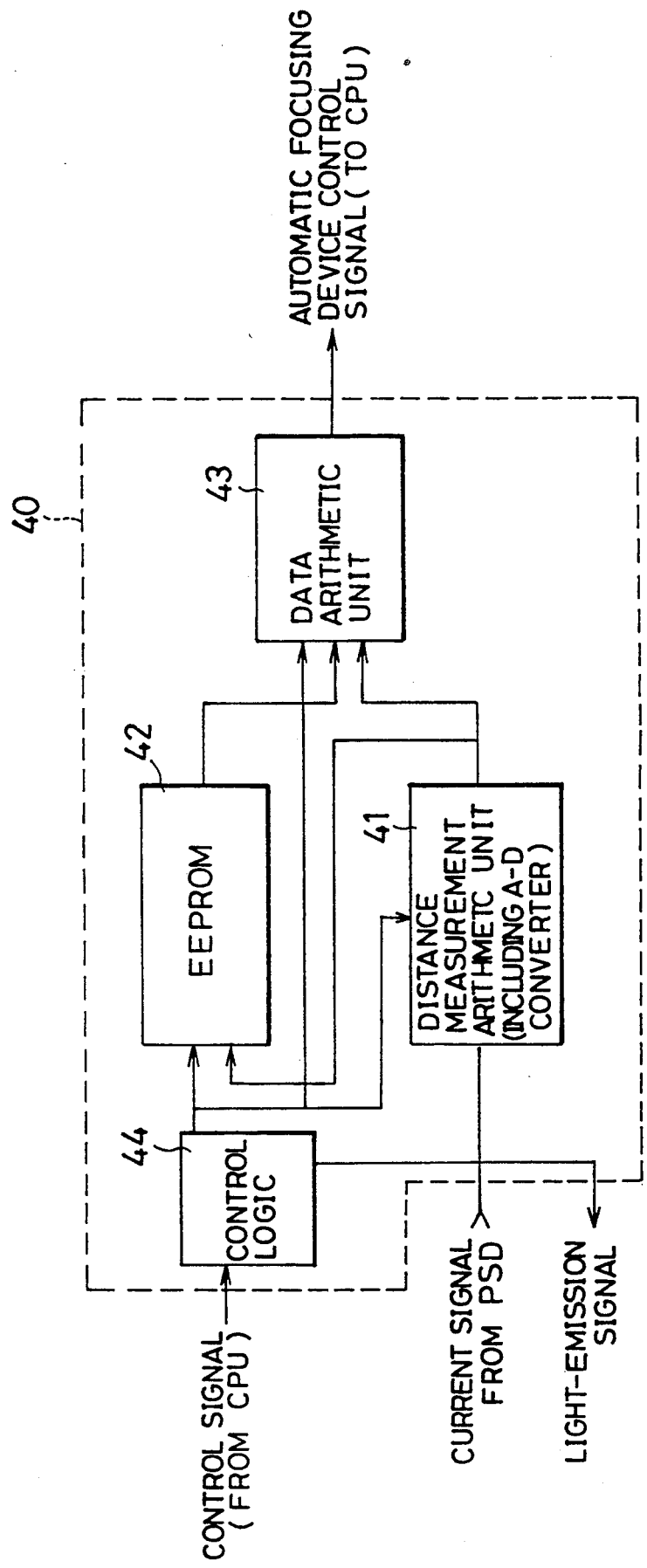
FIG. 2 is a schematic representation of the electrical structure of the distance measuring IC in the embodiment of FIG. 1.

FIG. 2 schematically shows an internal structure of the distance measuring IC 40.

This distance measuring IC 40 includes a distance measurement arithmetic unit 41 including an A-D converter, an 42 (Electrically Erasable Programmable Read Only Memory), the input of which is connected to the output of the distance measurement arithmetic unit 41, a data arithmetic unit 43 connected to the output of the distance measurement arithmetic unit 41 and also to the output of the EEPROM 42, and a control logic 44 for controlling the distance measurement arithmetic unit 41, the EEPROM 42 and the data arithmetic unit 43, which are each connected to the control logic 44. The input of the distance measurement arithmetic unit 41 is connected to the output of the PSD element 30, the control logic 44 is connected to the CPU 50 and the light-emitting diode 10, and the output of the data arithmetic unit 43 is connected to the CPU 50. There are three signal lines between the distance measuring IC 40 and the CPU 50 which include: two control lines to exchange control signals and a data line to send data from the distance measuring IC to the CPU 50.

The EEPROM 42 is formed by a CMOS process, while the other components are respectively formed from a bipolar IC. In other words, the distance measuring IC 40 is a one-chip IC formed by the Bi-CMOS process.

Figure 3:
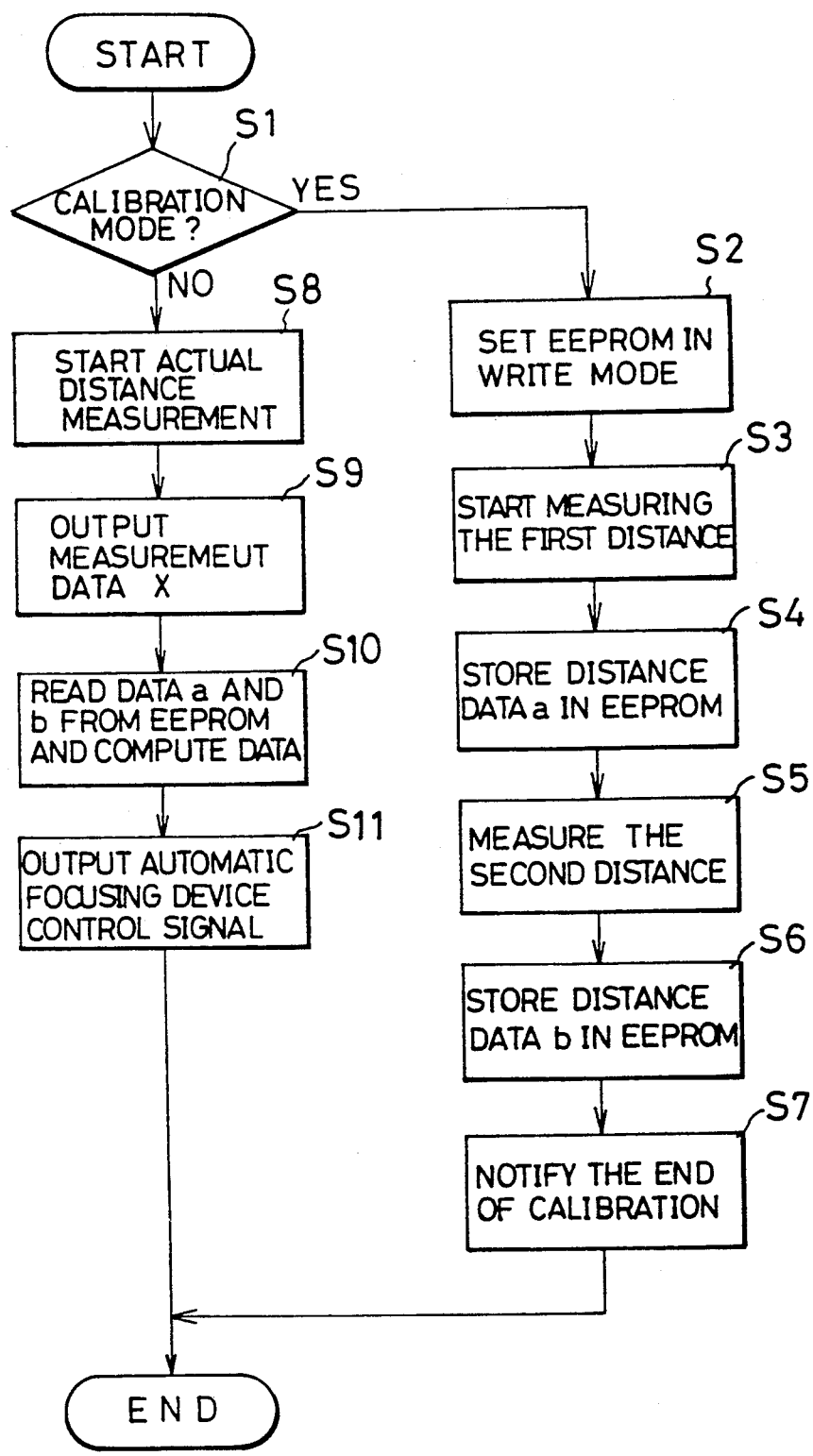
FIG. 3 is a flowchart of a control program of the CPU in the embodiment of FIG. 1.

The operation of the distance measuring unit will be described using the flowchart of the control program of the CPU 50, which is shown in FIG. 3.

There are two operation modes used for the distance measuring unit which include the calibration mode and the distance measuring mode.

The calibration mode is the initialization mode for adjustments before shipment of the distance measuring unit from the factory and for adjustments which may be required later on. When a decision is made that the calibration mode has been selected at step S1 of FIG. 3, steps S2 to S7 are executed. The CPU 50 sends a control signal to the control logic 44 of the distance measuring IC 40 to set the EEPROM 42 in the write mode (step S2). Another control signal is sent to the control logic 44 to start a distance measurement for initialization (step S3). Therefore, the light-emitting diode 10 is driven, and the light reflected by the subject (for distance measurement) located at a known, predetermined first distance away is applied to the PSD element 30. The PSD element 30 outputs two channels of signal currents according to the first distance, and the signal currents are input to the distance measurement arithmetic unit 41. The distance measurement arithmetic unit 41 amplifies those signal currents and inputs voltages compressed logarithmically by use of diodes to a couple of input terminals of a differential circuit, and obtains an output current proportional to a reciprocal number of the distance to the subject. This output current is converted from an analog form into digital form, and thereby producing digital distance measurement data a. Then, this distance measurement data a is written at a specified address of the EEPROM 42 under the control of the control logic 44 (step S4).

The same operations as in the steps S3 and S4 are performed with regard to the subject located at a known, predetermined second distance away (step S5), and distance measurement data b is written at a specified address of the EEPROM 42 (step S6). When the foregoing steps having been completed, the end of calibration is notified to the CPU 50 (step S7).

The distance measuring mode is a mode in which a regular distance measurement is performed for automatic focusing. When a decision is made that the distance measuring mode has been selected, steps S8 to S11 are executed. The CPU 50 sends a control signal to the control logic 44 to start a distance measuring operation (step S8). Therefore, the light-emitting diode 10 is driven, and the light reflected by the subject 20 at a distance which is to be measured is applied to the PSD element 30. The PSD element 30 outputs two channels of signal currents according to the distance, and the signal currents are input to the distance measurement arithmetic unit 41. The distance measurement arithmetic unit 41 amplifies those current and inputs voltages compressed logarithmically by diodes to the two input terminals of the differential circuit, and obtains an output current proportional to a reciprocal number of the distance to the subject. This output current is converted from an analog form to a digital form, for thereby producing digital distance measurement data x (step S9).

At the subsequent step S10, the data arithmetic unit 43 computes a control signal K for the automatic focusing device from the distance measurement data a and b stored in the EEPROM 42 and the above-mentioned distance measurement data x. This automatic focusing device control signal is a signal which indicates at what position the lens is to be stopped using zones set by division by a specified number (11 in the following example), where the zones represent distances from zero to infinity.

The first distance in the calibration mode is at the border point separating the n-th zone and the (n+1)-th zone, and measurement data obtained in calibration has been stored as measurement data a in the EEPROM 42. The second distance is at the border point separating the m-th zone and the (m+1)-th zone, and measurement data obtained in calibration has been stored as measurement data b in the EEPROM 42. If actual distance measurement data obtained in the distance measurement mode is x, the data arithmetic unit 43 computes an automatic focusing device control signal K by using the following linear function.

$$K = INT[n + (x-a)/\{(b-a)/(m-n)\}]$$

The circuit configuration of the data arithmetic unit 43 which performs the above computation is well-known.

An automatic focusing device control signal K computed by the data arithmetic unit 43 is transferred to the CPU 50 at the next step S11.

Figure 4:
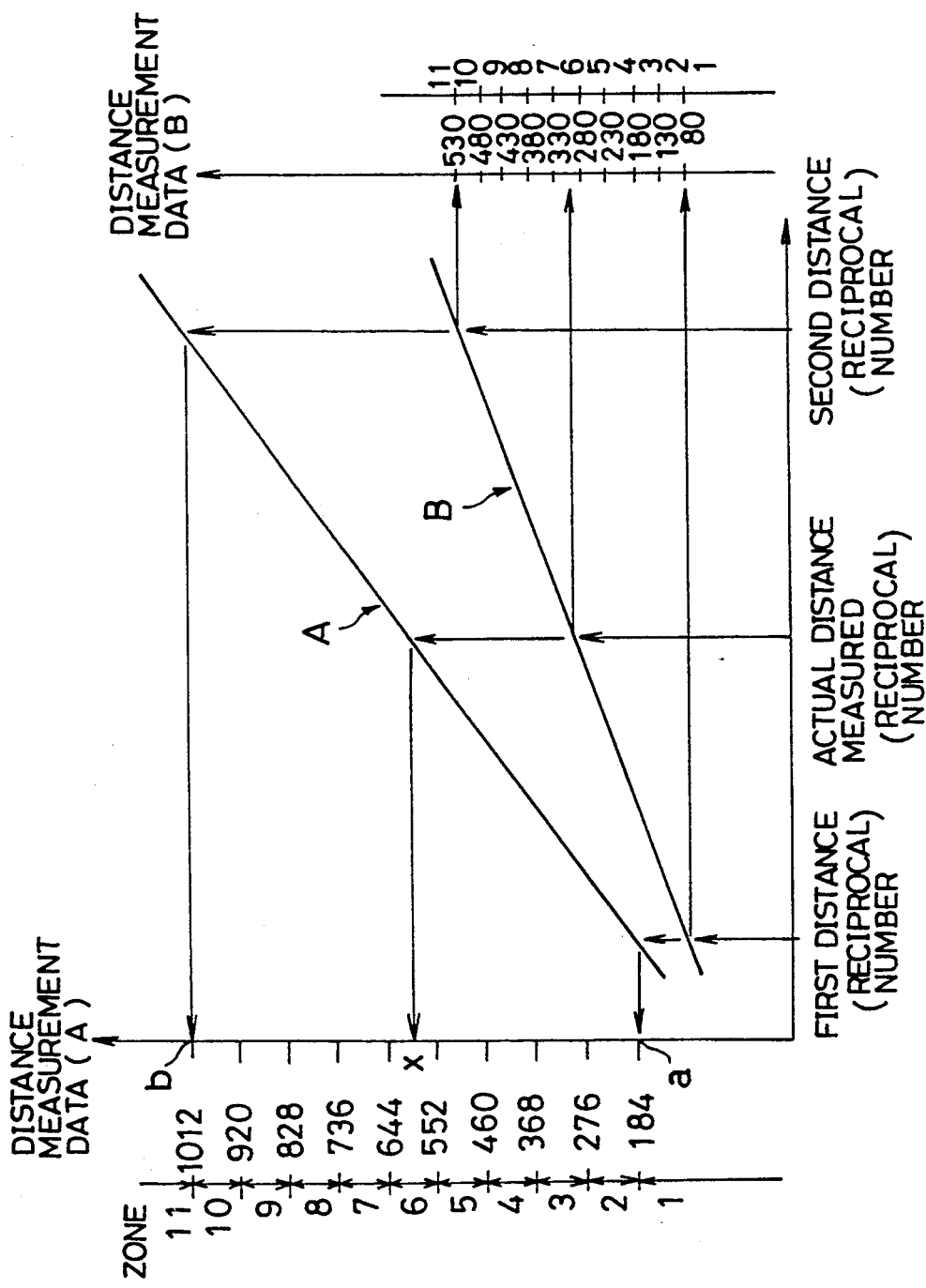
FIG. 4 shows a relation among the distances to the subject, and distance measurement data and divided zones for explaining the principle of operation of the distance measuring IC of FIG. 2.

FIG. 4 is a graph showing the relation between the distances to the subject, and the distance measurement data and the division zones, and presents two examples in which the distance from zero to infinity is divided into 11 division zones.

In one example (line A), the first distance in the calibration mode is at the border point dividing the first zone and the second zone, and the distance measurement data obtained in calibration has been stored as a=184 in the EEPROM 42. In addition, the second distance is at the border point dividing the 10th zone and the 11th zone, and the distance measurement data obtained in calibration has been stored as b=1012 in the EEPROM 42. If actual distance data obtained in the distance measuring mode is x, the data arithmetic unit 43 computes an automatic focusing device control signal K using the following linear function.

$$K = INT[1 + (x - 184)/\{(1012 - 184)/(10 - 1)\}]$$
$$= INT\{1 + 9(x - 184)/828\}$$

As a result, the automatic focusing device control signal K is the 6th zone as shown in FIG. 4.

Another example (line B) is a case in which this distance measuring unit is mounted on another automatic focusing device. The first distance in the calibration mode is at the border point dividing the first zone and the second zone, and the distance measurement data obtained in calibration has been stored as a=180 in the EEPROM 42. The second distance is at the border point dividing the 10th zone and the 11th zone, and the distance measurement data has been stored as b=530 in the EEPROM 42. If actual distance data obtained in the distance measuring mode is x, the data arithmetic unit 43 computes an automatic focusing device control signal K using the following linear function.

$$K = INT[1 + (x - 180)/\{(530 - 180)/(10 - 1)\}]$$
$$= INT\{1 + 9(x - 180)/390\}$$

Consequently, the automatic focusing device control signal K is the 6th zone as in the former case. In other words, when used with any automatic focusing device, this distance measuring unit produces the same value as the automatic focusing device control signal K.

As has been described, the distance measuring unit is so arranged as to be calibrated in response to a calibration command from the CPU 50, in such a manner that a known, true distance (the border between the zones in the above cases) is measured actually by the distance measuring unit to obtain distance measurement data, and the relation between the distance measurement data and the true distance is stored in the EEPROM 42. Therefore, the burden of preparing software of the CPU 50 of the distance measuring unit can be reduced substantially. Moreover, because the unit can be structured in a very simple form, it is possible to produce the distance measuring unit at a lower cost and with improved performance.

The above-mentioned preferred embodiments have been described with reference to examples of the active type distance measuring unit, but this invention may be applied to a passive type distance measuring unit, which utilizes the space phase difference, for example. In the above embodiments, a one-chip IC formed by the Bi-CMOS process has been used, but a one-chip IC formed by any other process may be used to produce a distance measuring IC according to the present invention. Furthermore, in place of the EEPROM, any other types of EPROM (Erasable Programmable Read Only Memory) may be used, such as a fuse type, for example.

Many widely different embodiments of the present invention may be constructed without departing from the spirit and scope of the present invention. It should be understood that the present invention is not limited to the specific embodiments described in the specification, except as defined in the appended claims.

What is claimed is:

1. An automatic focusing device including a semiconductor integrated circuit for measuring distance having a light-detecting element for receiving light from an object, the distance to the object is to be measured, and outputting a light-detecting signal according to the distance to the object, the semiconductor integrated circuit mounted in one chip and comprising:
   distance measurement arithmetic means for forming digital distance measurement data inversely proportional to the distance to the object from the light-detecting signal from the light-detecting element;
   memory means for writing therein two items of distance measurement data output from said distance measurement arithmetic means with regard to two known distances in a calibration mode; and
   data arithmetic means for computing in a distance measuring mode a control signal of the automatic focusing device from said two items of distance measurement data stored in said memory means and digital distance measurement data output from said distance measurement arithmetic means.

2. A semiconductor integrated circuit for measuring distance as claimed in claim 1, further comprising chip control logic means for selectively switching between said calibration mode and said distance measuring mode according to a control signal from outside in the one chip.

3. A semiconductor integrated circuit for measuring distance as claimed in claim 1, wherein said memory means comprises an EEPROM.

4. A semiconductor integrated circuit for measuring distance as claimed in claim 3, wherein said EEPROM is a CMOS device, and wherein the semiconductor integrated circuit is formed by the Bi-CMOS process.

5. A semiconductor integrated circuit for measuring distance as claimed in claim 1, wherein said semiconductor integrated circuit is for use with an active type automatic focusing unit.

6. A semiconductor integrated circuit as claimed in claim 1, wherein said data arithmetic means performs computation by using the following equation:

$$K=INT[n+(x-a)/\{(b-a)/(m-n)\}]$$

where n indicates said calibration mode, one known distance is a border point dividing the n-th zone and the (n+1)-th zone of said control signal of the automatic focusing device, a denotes distance measurement data obtained in calibration and placed in said memory means, m indicates said calibration mode, the other know distance is at a border point dividing the m-th zone and the (m+1)-th zone of said control signal of the automatic focusing device, b denotes distance measurement data obtained in calibration and placed in said memory means, and x denotes actual measurement data in said measuring mode.

7. An automatic focusing device including a semiconductor integrated circuit comprising:
   a light-emitting element for emitting light to an object, the distance to said object is to be measured;
   a light-detecting element for receiving a reflected light from said object, the distance to said object is to be measured, and outputting a light-detecting signal according to said distance to said object; and
   a semiconductor integrated circuit for measuring distance formed in one chip including, distance measurement arithmetic means for forming digital distance measurement data inversely proportional to said distance to said object from said light-detecting signal from said light-detecting element, memory means for writing therein two items of distance measurement data output from said distance measurement arithmetic means with regard to two known distances in a calibration mode; and data arithmetic means for computing in a distance measuring mode a control signal of the automatic focusing device from said two items of distance measurement data stored in said memory means and digital distance measurement data output from said distance measurement arithmetic means.

* * * * *